US012363132B2

(12) United States Patent
Burström et al.

(10) Patent No.: US 12,363,132 B2
(45) Date of Patent: Jul. 15, 2025

(54) SYSTEMS AND METHODS FOR DETECTING BROWSER MODE

(71) Applicant: BEHAVIOSEC INC., San Francisco, CA (US)

(72) Inventors: Per Burström, Luleå (SE); Philip Lindblad, Lidingö (SE); Mikael Åhlén, Västerås (SE)

(73) Assignee: LEXISNEXIS RISK SOLUTIONS FL INC., Boca Raton, FL (US)

(*) Notice: Subject to any disclaimer, the term of this patent is extended or adjusted under 35 U.S.C. 154(b) by 380 days.

(21) Appl. No.: 18/159,746

(22) Filed: Jan. 26, 2023

(65) Prior Publication Data
US 2024/0259394 A1    Aug. 1, 2024

(51) Int. Cl.
*H04L 9/40* (2022.01)

(52) U.S. Cl.
CPC ........ *H04L 63/1408* (2013.01); *H04L 63/145* (2013.01)

(58) Field of Classification Search
USPC .......................................................... 726/22
See application file for complete search history.

(56) References Cited

U.S. PATENT DOCUMENTS

| | | | |
|---|---|---|---|
| 2018/0034850 A1* | 2/2018 | Turgeman | G06Q 30/0275 |
| 2020/0244639 A1* | 7/2020 | Arif Khan | G06N 20/10 |
| 2021/0084451 A1* | 3/2021 | Williams | H04W 4/38 |
| 2022/0245225 A1* | 8/2022 | Hou | G06F 11/3438 |
| 2022/0335340 A1* | 10/2022 | Moustafa | G06N 20/00 |

* cited by examiner

*Primary Examiner* — Sanchit K Sarker
(74) *Attorney, Agent, or Firm* — TROUTMAN PEPPER LOCKE LLP; James E. Schutz; Mark Lehi Jones

(57) ABSTRACT

The systems and methods are provided that can enable the detection of certain modes of online interactions carried out by a user's computing device, for example, when an online app or webpage of an enterprise is accessed by the user's computing device. Certain exemplary implementations may utilize collector code that resides in the app or webpage opened by users accessing the enterprise service to measure and collect timing data to detect whether the user's computing device or associated browsing session is subjected to modes of manipulation such as the user browser's privacy mode being engaged, malware interacting with the browsing session, and/or some type of aggregator interacting with the browsing session. Such modes of manipulation can impact the utility and accuracy of certain forms of behavioral biometric algorithms, particularly those that utilize users' typing, timing, keystroke dwell, etc.

17 Claims, 6 Drawing Sheets

SYSTEMS AND METHODS FOR DETECTING BROWSER MODE

FIELD OF THE DISCLOSED TECHNOLOGY

The disclosed technology relates generally to behavioral biometrics, and more particularly to systems and methods for utilizing timing data to detect when a user's browser is in a privacy mode or subjected to malware or an aggregator.

BACKGROUND

Traditional authentication methods that rely solely on passcodes, PINs, etc., to authenticate users are becoming less effective for online security and privacy due to malware and privacy breaches that can expose a user's login credentials to bad actors. Thus, advanced authentication security measures, such as behavioral biometrics, are gaining popularity because such methods can be used to identify measurable patterns in online activities via the analysis of a user's online interactions and associated dynamics. Behavioral biometrics analysis can be used to make sure that the correct user is authenticated for accessing privileged content, or for finding fraudulent use or other anomalous aspects of using the service.

A behavioral biometrics service can provide an enhanced layer of security based on a user's typing, timing, keystroke dwell, etc., for example, when the user interacts with a webpage of an enterprise (such as a business, service provider, governmental agency, etc.). Thus, behavioral authentication methods can provide an extra layer of authentication security and can improve the user experience, particularly when such methods are seamless and/or non-disruptive.

Most modern web browsers, however, include a "privacy mode" that can be enabled to severely inhibit tracking across visited websites, advertiser networks, etc. Privacy mode options are available that can block trackers, mask IP addresses and other device-specific identifiers, and or randomize behavioral data that could otherwise be used to identify and track users. Furthermore, certain forms of malware and/or data aggregation may inhibit the use of behavioral data. Thus, situations can arise when behavioral biometrics algorithms may be unknowingly subjected to a browser's privacy mode, malware, or some type of aggregator.

There is a need for improved systems and methods for detecting when a user's browser is in privacy mode or subjected to malware or an aggregator.

BRIEF SUMMARY

Certain exemplary implementations of the disclosed technology may be utilized to detect browsing session manipulation that may influence the accuracy of behavioral biometrics.

A method is provided for remotely detecting and categorizing browsing session manipulation. The method includes receiving, at a behavioral biometrics server, from an enterprise server executing collector code, and responsive to a user browser accessing a service on the enterprise server, code collector self-timing data, wherein the collector code comprises a recursive function that captures the code collector self-timing data associated with a browsing session, computing median values of the code collector self-timing data, computing variance values of the code collector self-timing data, binning the median values and variance values, determining based on the binned values, a manipulation associated with the browsing session, and based on the determining, sending an alert to an operator of the behavioral biometrics server or a security layer of the behavioral biometrics server.

In another exemplary implementation, a system is provided for remotely detecting and categorizing browsing session manipulation. The system includes a processor and a memory having programming instructions stored thereon, which, when executed by the processor, cause the processor to receive, at a behavioral biometrics server, by collector code residing on an enterprise server, and responsive to a user browser accessing a service on the enterprise server, code collector self-timing data, wherein the collector code comprises a recursive function that captures the code collector self-timing data, compute, with a timing data median module, median values of the code collector self-timing data, compute, with a timing data variance module, variance values of the code collector self-timing data, bin the median values and variance values, determine, by a discriminator module, based on the binned values, a privacy mode engaged in the user browser, malware associated with the user browser accessing a service, or an aggregator associated with the user browser accessing a service. Based on the determination, the system may be configured to send an alert to the user.

In another exemplary implementation, a non-transitory computer-readable medium is provided having stored thereon software instructions that, when executed by a processor, cause the processor to perform a method of receiving, at a behavioral biometrics server, from an enterprise server executing collector code, and responsive to a user browser accessing a service on the enterprise server, code collector self-timing data, wherein the collector code comprises a recursive function that captures the code collector self-timing data associated with a browsing session, computing median values of the code collector self-timing data, computing variance values of the code collector self-timing data, binning the median values and variance values, determining based on the binned values, a manipulation associated with the browsing session, and based on the determining, sending an alert to an operator of the behavioral biometrics server or a security layer of the behavioral biometrics server.

In accordance with certain exemplary implementations of the disclosed technology, the manipulation associated with the browsing session can be caused by a privacy mode being engaged in the user browser. In certain exemplary implementations, the manipulation associated with the browsing session can be caused by malware interaction with the browsing session. In certain exemplary implementations, the manipulation associated with the browsing session can be caused by aggregator interaction with the browsing session.

Certain implementations of the disclosed technology will now be described with the aid of the following drawings and the detailed description.

The disclosed technology will now be described using the detailed description in conjunction with the drawings and the attached claims.

DETAILED DESCRIPTION

The systems and methods disclosed herein can enable the detection of certain modes of online interactions carried out by a user's computing device, for example, when an online app or webpage of an enterprise (such as a business, service provider, governmental agency, etc.) is accessed by the user's computing device. Certain exemplary implementations may utilize collector code that resides in the app or webpage opened by users accessing the enterprise service to measure and collect timing data to detect whether the user's computing device is subjected to a browser's privacy mode, malware, or some type of aggregator. Such modes can impact the utility and accuracy of certain forms of behavioral biometric algorithms, particularly those that utilize users' typing, timing, keystroke dwell, etc.

Various implementations of the disclosed technology may be utilized to determine modes of online interactions that could impact the usefulness or accuracy of behavioral biometrics, which is discussed in U.S. Pat. No. 10,068,076 entitled "Behavioral authentication system using a behavior server for authentication of multiple users based on their behavior," which is incorporated by reference herein as if presented in full.

Since privacy modes, malware, and/or data aggregation may inhibit the use of behavioral data, situations can arise when behavioral biometrics algorithms may be unknowingly subjected to a browser's privacy mode, malware, or some type of aggregator. Certain implementations of the disclosed technology may detect online communication modes in which behavioral data may be impacted by privacy settings, malware, or an aggregator such that behavioral biometrics may not be relied upon to identify and/or track users.

Conventional behavioral biometrics systems do not have a way of handling mismatched or manipulated behavioral data (i.e., due to a bot, aggregator, malware, and/or browser privacy mode) and often, a legitimate user's session may be flagged with a false positive due to the changed behavioral-related timing distributions. In contrast, the disclosed technology may be utilized to detect and indicate the type of communication mode manipulation and may allow the system to handle such instances rather than incorrectly flagging the communications session as fraud/positive. Certain exemplary implementations of the disclosed technology may enable the suppression of false positives for behavioral biometrics via the detection of the above-mentioned communication modes.

Certain embodiments of the disclosed technology will become clearer in view of the following description of the drawings.

Figure 1:
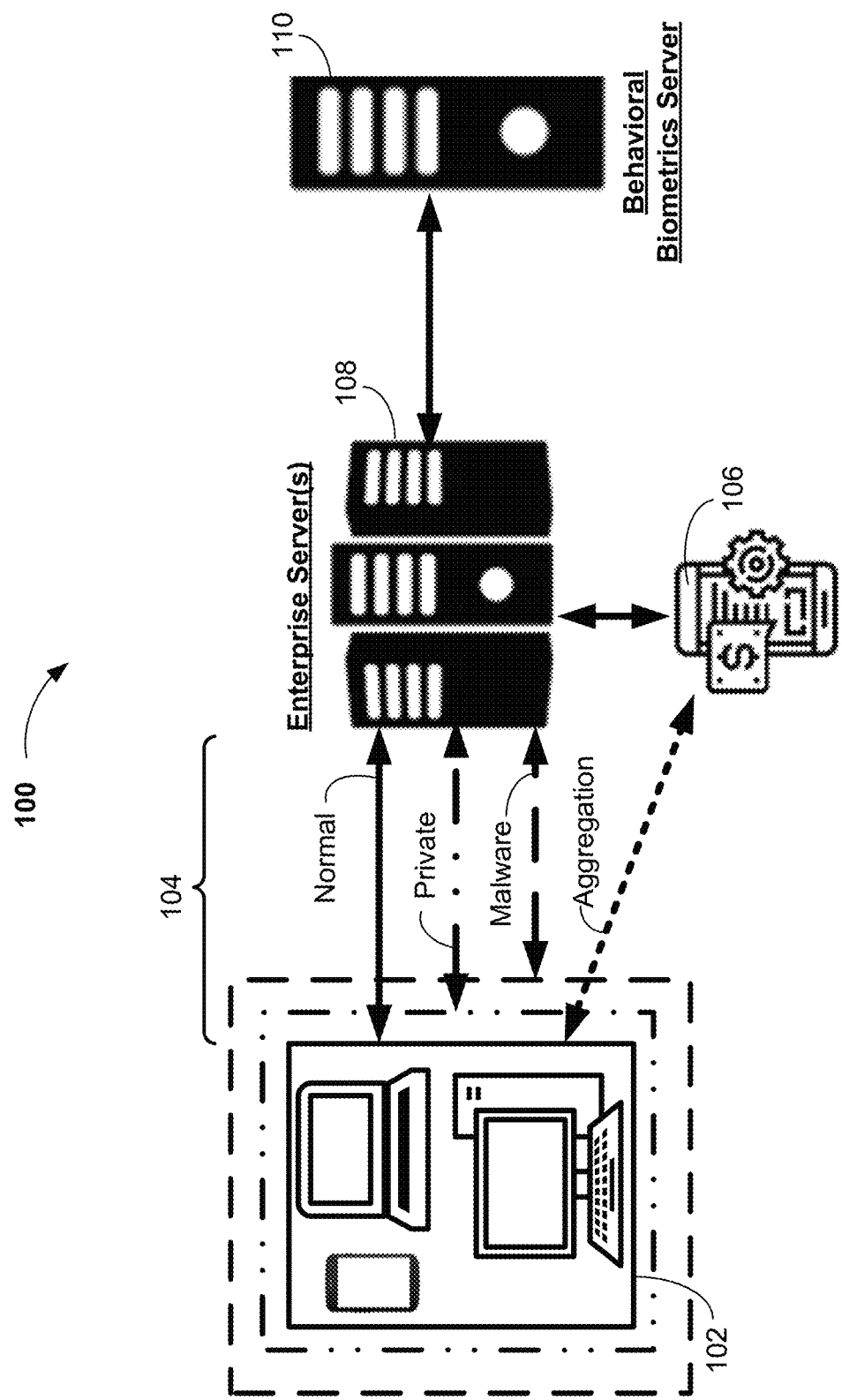
FIG. 1 is an example block diagram illustration of a system, according to certain implementations of the disclosed technology.

Reference is now made to FIG. 1, which is a block diagram illustration of a system 100, according to certain implementations of the disclosed technology, in which a user's computing device 102 may communicate with an Enterprise Server 108 using various communication modes 104. The communication modes 104 can include normal browsing, private browsing, and/or the presence of malware or an aggregator 106 in the communication channel between a user device 102 and the Enterprise Server(s) 108. In certain exemplary implementations, the Enterprise Server 108 and/or the user device 102 may be in communication with a Behavioral Biometrics Server 110.

In accordance with certain exemplary implementations of the disclosed technology, the arrangement depicted in FIG. 1 may illustrate a typical scenario where a user device 102 is utilized for online communication with a bank or other service provider having an Enterprise Server 108 that provides digital services through the web or via its own apps, which may be downloaded to the user device 102 via the Google Play Store or Apple Store. To enable behavioral biometrics security to be applied to the user interactions performed by the user device 102, the collector code may reside in the page or app opened by the user device 102 accessing the service provided by the Enterprise Server 108. In certain exemplary implementations, the collector code may collect and/or register data of user interactions. In certain exemplary implementations, the data collected by the collector code may be uploaded to the Behavioral Biometrics Server 110. In certain exemplary implementations, the collector code may register timing data from ups and downs of keystrokes, coordinate and timestamp data from mouse or touchscreens, and for mobile devices, the data may further comprise sensor readings from accelerometers, gyroscopes, light sensors, etc. As will be discussed below, the collector code may also be used to determine a mode 104 of communication via measurement and analysis of self-timing data gathered by the collector code.

Figure 2:
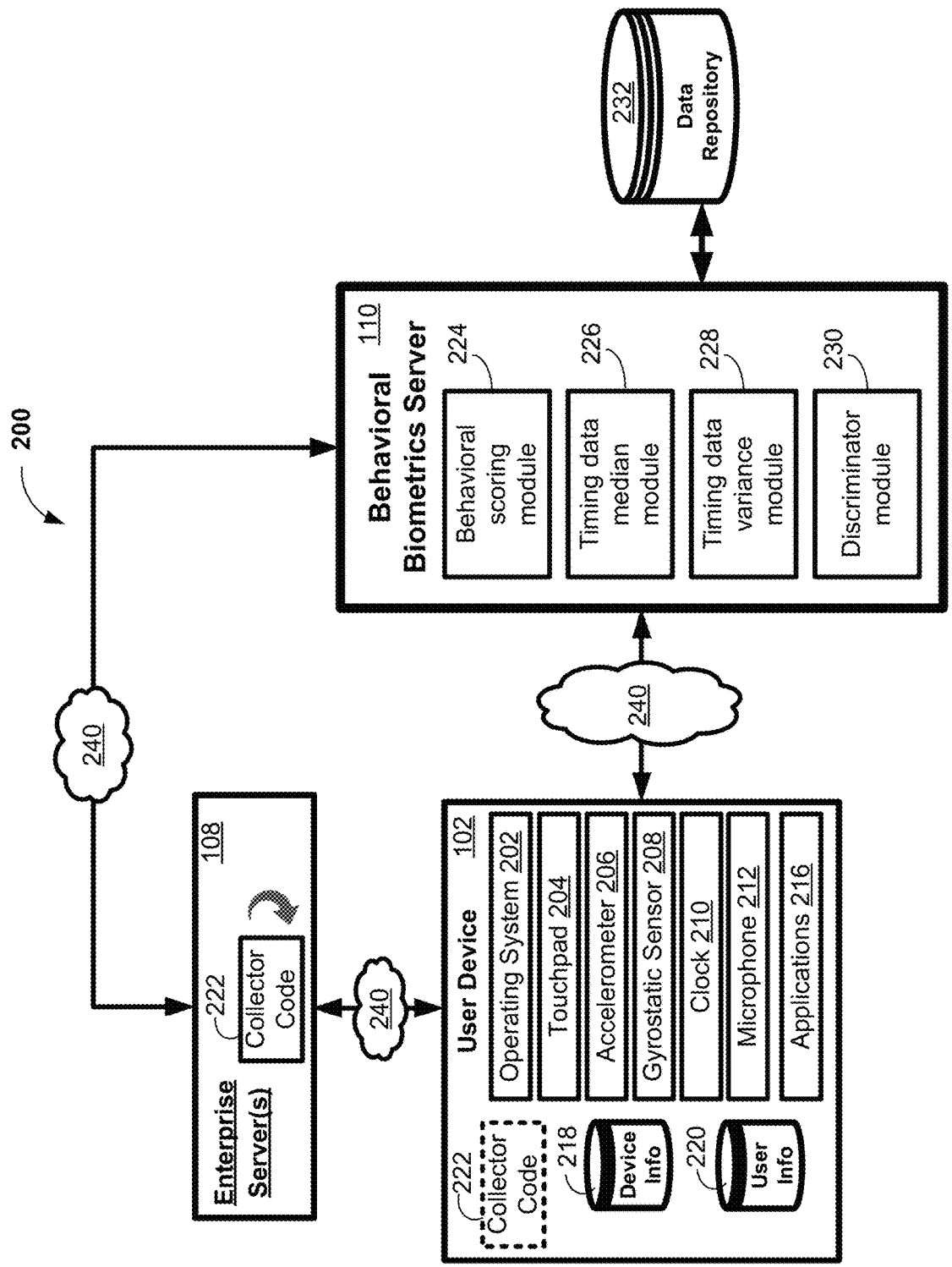
FIG. 2 is an example block diagram of a system, in accordance with certain exemplary implementations of the disclosed technology. in which code collector may be utilized to distinguish a browsing mode or the presence of malware or aggregator in a communication channel between a user device and an enterprise server.

FIG. 2 is a more detailed example block diagram of a system 200, (which may correspond to the system 100 shown in FIG. 1). In accordance with certain exemplary implementations of the disclosed technology, collector code 222 may be utilized to distinguish a browsing mode and/or the presence of malware or an aggregator in a communication channel between the user device 102 and the Enterprise Server 108.

In certain exemplary implementations, the user device 102 may include an operating system 202, a clock 210, applications 216, and one or more of a touchpad 204, an accelerometer 206, a gyrostatic sensor 208, and/or a microphone 212. Certain device information 218 may be stored in the memory of the user device 102. In certain exemplary implementations, user information 220 may be stored in the memory of the user device 102. In accordance with certain exemplary implementations of the disclosed technology, the collector code 222 may (optionally) reside on the user device 102, for example, via a downloaded app that allows the user device 102 to communicate with the Enterprise Server 108. In other exemplary embodiments, the collector code 222 may reside with the Enterprise Server 108, for example, via JavaScript on a website of the Enterprise Server 108.

In certain exemplary implementations, the user device 102, the Enterprise Server 108, and/or the Behavioral Biometrics Server 110 may be in communication with one another via communications channels 240 including, but not limited the Internet.

The Behavioral Biometrics Server 110 may include various modules, such as a behavioral scoring module 224, a timing data median module 226, a timing data variance module 228, a discriminator module 230, etc., which may be used to enable the various functions of the Behavioral Biometrics Server 110. The behavioral scoring module 224, for example, may be utilized for authenticating or verifying users of the user device 102 under normal modes of communication based on behavioral data supplied by the collector code 222. Certain exemplary implementations of the Behavioral Biometrics Server 110 may be in communication with a data repository 232, for example, which may be used to store user, device, and/or previous behavioral data.

In accordance with certain exemplary implementations of the disclosed technology, the above-referenced collector code 222 may contain a function that recursively calls itself with a fixed interval (e.g., every 10 milliseconds) and may note and store the result of the call in a binned distribution, which may serve as a reference that enables the Behavioral Biometrics Server 110 to determine the level and/or characteristics of distortion of timing events that are produced during the online session, for example, by evaluating the resulting distribution of timing data.

In certain exemplary implementations, the collector code 222 may be implemented as a timer function, as illustrated in the following algorithmic code:

```
function timer(base, events, ticks, max)
  t = time( )
  events[t - base] = (events[t - base] or 0) + 1
  if ticks > max then
    return
  end
  schedule(( ) => timer(t, events, ticks++, max), 10)
end
events = { }
timer(time( ), events, 0, 100)
```

In the above example code, schedule( ) calls timer( ) every 10 milliseconds and stores the timestamps between the current time and base time in an event vector. In an example implementation involving a user device 102 under normal browsing conditions, the inherent randomness of the efforts and timings of a human interacting with the device may produce random latency increases in the user device 102, thus enlarging the spread of the distribution stored in the event vector.

Figure 3:
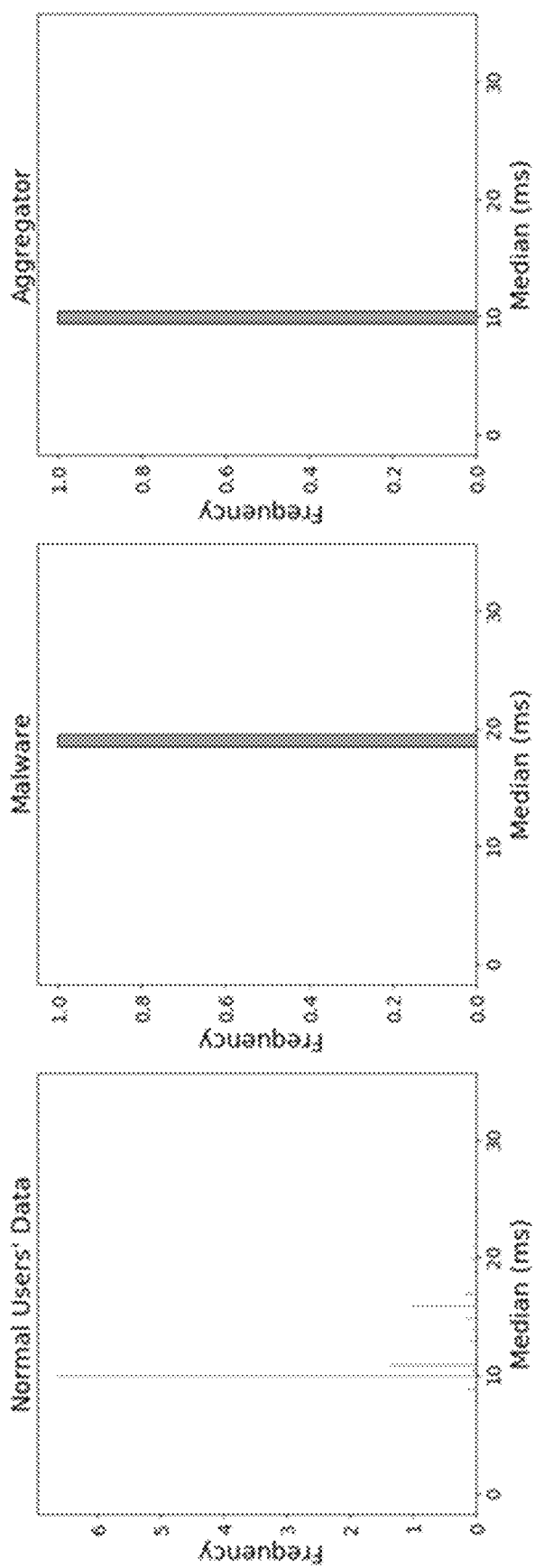
FIG. 3 shows three examples of code collector median timing data, in accordance with certain exemplary implementations of the disclosed technology. The leftmost chart shows an example of normal browsing timing data distributions. The middle chart depicts example timing data distributions when malware is involved in the communication channel. The rightmost chart shows example timing data when an aggregator is involved in the communication channel

FIG. 3 shows three examples of code collector median timing data, in accordance with certain exemplary implementations of the disclosed technology. The leftmost chart shows an example of normal browsing timing data distributions. The middle chart depicts example timing data distributions when malware is involved in the communication channel. The rightmost chart shows example timing data when an aggregator is involved in the communication channel. As indicated in FIGS. 3, a normal unaltered stream of timing data (leftmost chart) may have a timing distribution with a peak at a fixed interval (in this case, every 10 milliseconds), but with a non-zero variance, which may be due to randomness of user movements, events being cut off, etc.

Figure 4:
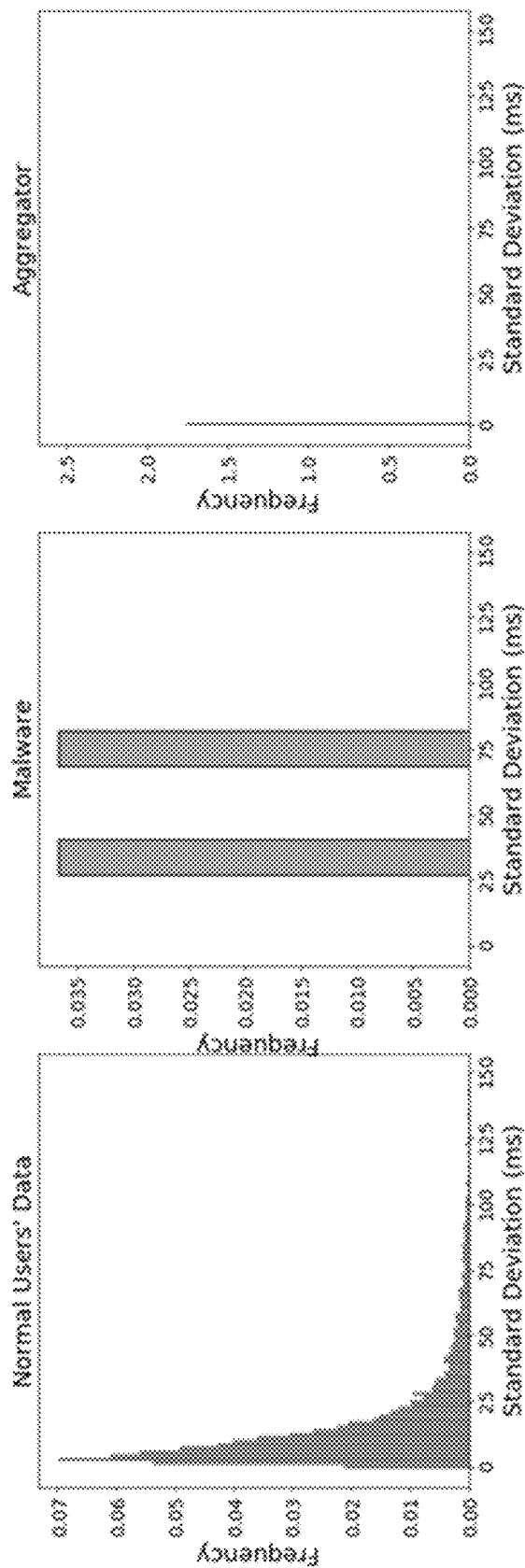
FIG. 4 shows three examples of code collector timing standard deviation data, in accordance with certain exemplary implementations of the disclosed technology. The leftmost chart shows example standard deviation timing data for normal browsing. The middle chart depicts example standard deviation timing data for when malware is involved in the communication channel. The rightmost chart shows example standard deviation timing data when an aggregator is involved in the communication channel.

FIG. 4 shows three examples of code collector timing standard deviation data, in accordance with certain exemplary implementations of the disclosed technology. The leftmost chart shows example standard deviation timing data for normal browsing. The middle chart depicts example standard deviation timing data for when malware is involved in the communication channel. The rightmost chart shows example standard deviation timing data when an aggregator is involved in the communication channel.

In accordance with certain exemplary implementations of the disclosed technology, collector code applied to a privacy mode-enabled browser may, in some cases only, display median event timing values of zero and some other fixed number, thereby producing a bimodal distribution. In certain embodiments, the bimodality may be used to determine the likelihood that the browser is being used in privacy mode. In accordance with certain exemplary implementations of the disclosed technology, and upon detection of a privacy mode, associated behavioral biometrics algorithms in the collector code may be used to determine the probability of a session involving a genuine user. In another embodiment, a measure of the entropy of the timings, i.e., a measure of the amount of "surprise" or randomness of the data, may be used to determine if privacy mode is enabled or not.

In accordance with certain exemplary implementations of the disclosed technology, and to determine whether a privacy mode is enabled or not, N timing samples may be collected, and the associated timing distribution(s) can be quantified using the following example steps. First, the standard deviation between the N samples xi may be calculated as sigma=sqrt(1/N*Sum(xi)−mu)), which is the normal formulation for computing a standard deviation. To classify the session as being from a bimodal distribution, i.e., stemming from a browser privacy mode, selected percentiles of the distribution can be compared. For example, if two low percentiles (say 10 and 40) are equal to each other but not equal to some higher percentiles (which themselves are equal to each other), this can provide an indicator that there are two singular values in the distribution (effectively, two distributions without variance). If the distribution spreads around the median value more than a threshold of, say, sigma>0.1*median, the session may be classified as normal. If all percentiles are equal and variance is below 0.1*median, the session may be classified as anomalous (which can mean malware or aggregator), as it would not represent a normal browsing session.

In certain exemplary implementations, the disclosed technology may utilize a z-test or another established statistical testing method to determine the likelihood that the timing data stems from a pre-defined category of users, such as a normal user, a normal user with a privacy mode, an aggregator, etc.

As shown in the center plot of FIG. 3, malware may displace the recursive code timings of the collector code by inducing delays into the event stream and may do so with a fixed timing such that the resulting variance is zero. A similar case is seen for an aggregator (rightmost chart) that uses a headless browser and screen-scraping of the Enterprise Server to enable entitled access to services, for example, through a Payment Service Provider open banking directive such as PSD2.

Figure 5:
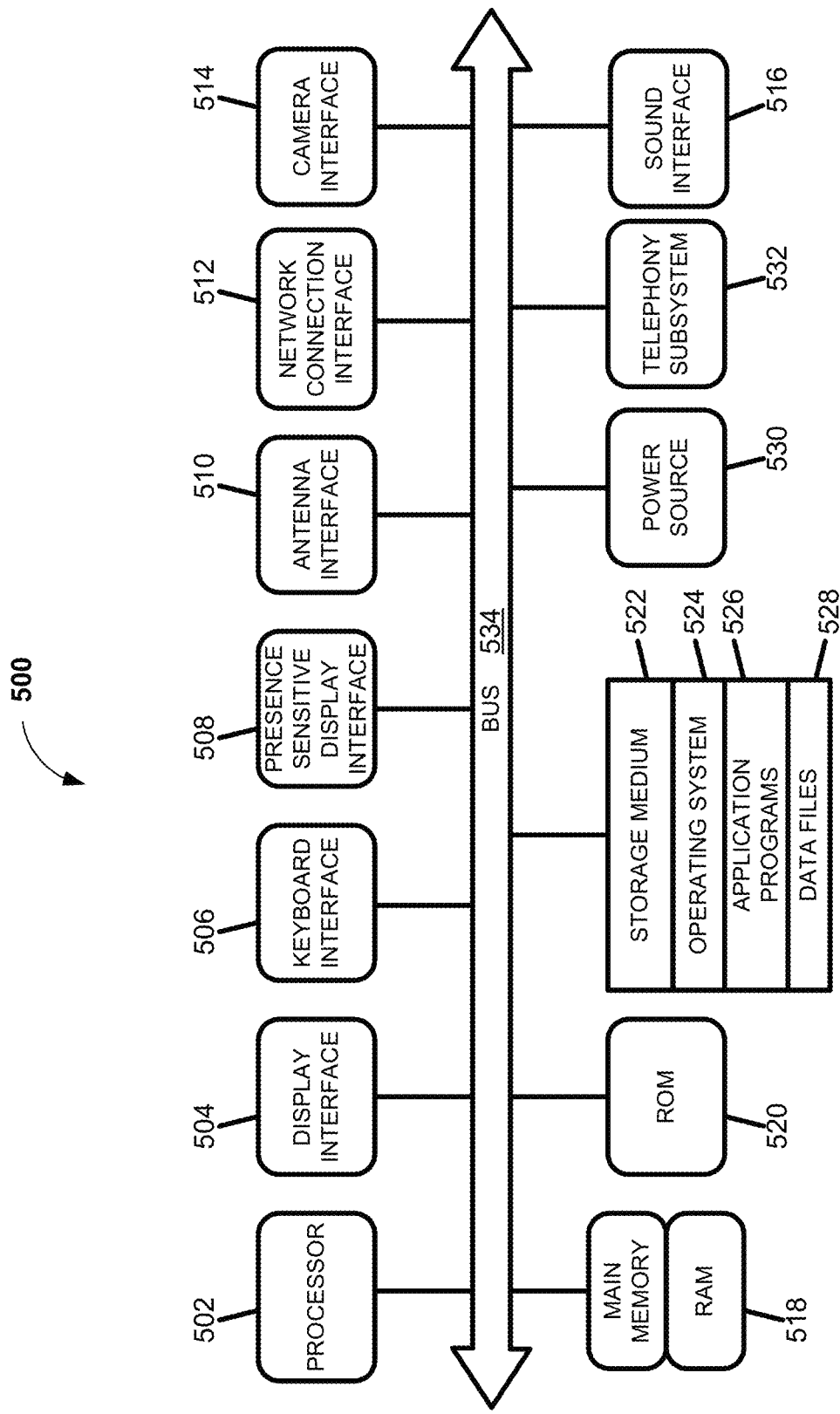
FIG. 5 is a high-level block diagram of a computing device that may be used to carry out embodiments of the disclosed technology.

FIG. 5 depicts a block diagram of an illustrative computing device 500 that may be utilized to enable certain aspects of the disclosed technology. Various implementations and methods herein may be embodied in non-transitory computer-readable media for execution by a processor. It will be understood that the computing device 500 is provided for example purposes only and does not limit the scope of the various implementations of the communication systems and methods.

The computing device 500 of FIG. 5 includes one or more processors where computer instructions are processed. The computing device 500 may comprise the processor 502, or it may be combined with one or more additional components shown in FIG. 5. In some instances, a computing device may be a processor, controller, or central processing unit (CPU). In yet other instances, a computing device may be a set of hardware components.

The computing device 500 may include a display interface 504 that acts as a communication interface and provides functions for rendering video, graphics, images, and texts on the display. In certain example implementations of the disclosed technology, the display interface 504 may be directly connected to a local display. In another example implementation, the display interface 504 may be configured for providing data, images, and other information for an external/remote display. In certain example implementations, the display interface 504 may wirelessly communicate, for example, via a Wi-Fi channel or other available network connection interface 512 to the external/remote display.

In an example implementation, the network connection interface 512 may be configured as a communication interface and may provide functions for rendering video, graphics, images, text, other information, or any combination thereof on the display. In one example, a communication interface may include a serial port, a parallel port, a general-purpose input and output (GPIO) port, a game port, a universal serial bus (USB), a micro-USB port, a high-definition multimedia (HDMI) port, a video port, an audio port, a Bluetooth port, a near-field communication (NFC) port, another like communication interface, or any combination thereof. In one example, the display interface 504 may be operatively coupled to a local display. In another example, the display interface 504 may wirelessly communicate, for example, via the network connection interface 512 such as a Wi-Fi transceiver to the external/remote display.

The computing device 500 may include a keyboard interface 506 that provides a communication interface to a keyboard. According to certain example implementations of the disclosed technology, the presence-sensitive display interface 508 may provide a communication interface to various devices such as a pointing device, a touch screen, etc.

The computing device 500 may be configured to use an input device via one or more of the input/output interfaces (for example, the keyboard interface 506, the display interface 504, the presence-sensitive display interface 508, the network connection interface 512, camera interface 514, sound interface 516, etc.) to allow a user to capture information into the computing device 500. The input device may include a mouse, a trackball, a directional pad, a trackpad, a touch-verified trackpad, a presence-sensitive trackpad, a presence-sensitive display, a scroll wheel, a digital camera, a digital video camera, a web camera, a microphone, a sensor, a smartcard, and the like. Additionally, the input device may be integrated with the computing device 500 or may be a separate device. For example, the input device may be an accelerometer, a magnetometer, a digital camera, a microphone, and an optical sensor.

Example implementations of the computing device 500 may include an antenna interface 510 that provides a communication interface to an antenna; a network connection interface 512 that provides a communication interface to a network. According to certain example implementations, the antenna interface 510 may utilize to communicate with a Bluetooth transceiver.

In certain implementations, a camera interface 514 may be provided that acts as a communication interface and provides functions for capturing digital images from a camera. In certain implementations, a sound interface 516 is provided as a communication interface for converting sound into electrical signals using a microphone and for converting electrical signals into sound using a speaker. According to example implementations, random-access memory (RAM) 518 is provided, where computer instructions and data may be stored in a volatile memory device for processing by the CPU 502.

According to an example implementation, the computing device 500 includes a read-only memory (ROM) 520 where invariant low-level system code or data for basic system functions such as basic input and output (I/O), startup, or reception of keystrokes from a keyboard are stored in a non-volatile memory device. According to an example implementation, the computing device 500 includes a storage medium 522 or other suitable types of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 524, application programs 526 (including, for example, a web browser application, a widget or gadget engine, and or other applications, as necessary) and data files 528 are stored. According to an example implementation, the computing device 500 includes a power source 530 that provides an appropriate alternating current (AC) or direct current (DC) to power components. According to an example implementation, the computing device 500 includes a telephony subsystem 532 that allows the device 500 to transmit and receive sound over a telephone network. The constituent devices and the CPU 502 communicate with each other over a bus 534.

In accordance with an example implementation, the CPU 502 has an appropriate structure to be a computer processor. In one arrangement, the computer CPU 502 may include more than one processing unit. The RAM 518 interfaces with the computer bus 534 to provide quick RAM storage to the CPU 502 during the execution of software programs such as the operating system application programs, and device drivers. More specifically, the CPU 502 loads computer-executable process steps from the storage medium 522 or other media into a field of the RAM 518 to execute software programs. Data may be stored in the RAM 518, where the data may be accessed by the computer CPU 502 during execution. In one example configuration, the device 500 includes at least 128 MB of RAM, and 256 MB of flash memory.

The storage medium 522 itself may include a number of physical drive units, such as a redundant array of independent disks (RAID), a floppy disk drive, a flash memory, a USB flash drive, an external hard disk drive, a thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer-readable storage media allow the device 500 to access computer-executable process steps, application programs, and the like, stored on removable and non-removable memory media, to off-load data from the device 500 or to upload data onto the device 500. A computer program product, such as one utilizing a communication system may be tangibly embodied in storage medium 522, which may comprise a machine-readable storage medium.

According to one example implementation, the term computing device, as used herein, may be a CPU, or conceptualized as a CPU (for example, the CPU 502 of FIG. 5). In this example implementation, the computing device (CPU) may be coupled, connected, and/or in communication with one or more peripheral devices.

It should also be understood by one skilled in the art that the devices depicted in FIG. 1 and/or FIG. 2 may be implemented on a computing device 500 such as is shown in FIG. 5.

Figure 6:
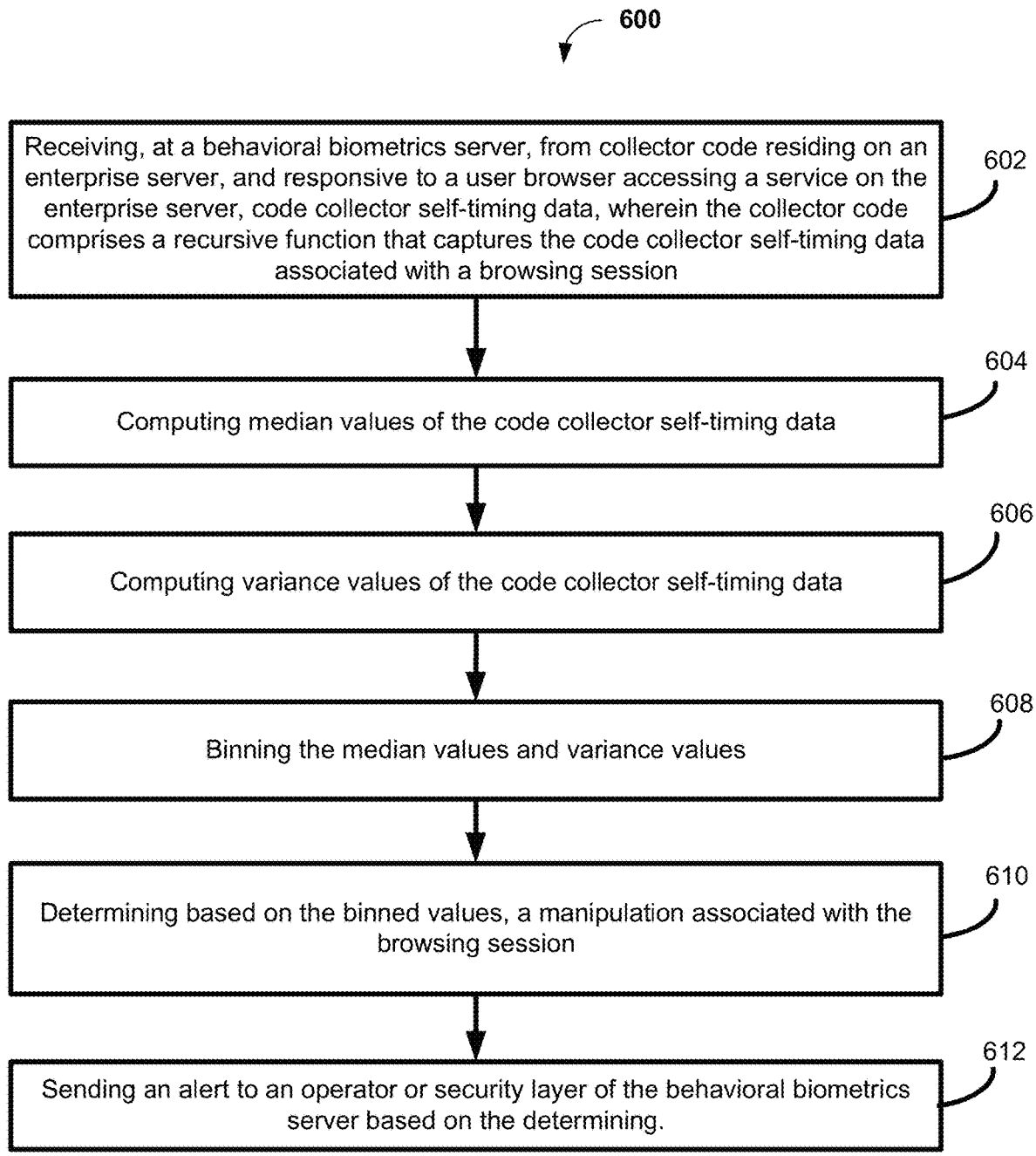
FIG. 6 is a flow diagram of a method, in accordance with certain implementations of the disclosed technology.

FIG. 6 is a flow diagram of a method 600 for remotely detecting and categorizing browsing session manipulation. In block 602, the method 600 includes receiving, at a behavioral biometrics server, from an enterprise server executing collector code, and responsive to a user browser accessing a service on the enterprise server, code collector self-timing data, wherein the collector code comprises a recursive function that captures the code collector self-timing data associated with a browsing session. In block 604, the method 600 includes computing median values of the code collector self-timing data. In block 606, the method 600 includes computing variance values of the code collector self-timing data. In block 608, the method 600 includes binning the median values and variance values. In block 610, the method 600 includes determining based on the binned values, a manipulation associated with the browsing session. In block 612, the method 600 includes sending an alert to an operator of the behavioral biometrics server or a security layer of the behavioral biometrics server based on the determining.

Some implementations may include sending an alert to the user based on the determining.

In certain exemplary implementations, the manipulation associated with the browsing session can be caused by a privacy mode being engaged in the user browser. In certain exemplary implementations, the manipulation associated with the browsing session can be caused by malware interaction with the browsing session. In certain exemplary implementations, the manipulation associated with the browsing session can be caused by aggregator interaction with the browsing session.

Certain exemplary implementations of the disclosed technology can include modifying a behavioral biometrics algorithm based on the determining.

Certain exemplary implementations of the disclosed technology can further include sending an alert to the enterprise server based on the determining. Certain exemplary implementations of the disclosed technology can include setting a system flag to mitigate a false positive based on the determining.

In certain exemplary implementations, the results of the recursive function may be stored in a binned distribution database the behavioral biometrics server. The recursive function may call itself within a fixed interval. In some implementations, the fixed interval may be in the range of 1 to 100 milliseconds. In one exemplary implementation of the disclosed technology, the fixed interval may be set to 10 milliseconds.

According to certain implementations of the disclosed technology, the service (for example, at the Enterprise Server) may be accessed via a webpage or a web app.

In accordance with certain exemplary implementations of the disclosed technology, the collector code may further measure interaction events such as keystroke data, mouse data, touchscreen data, sensor data, etc., for behavioral biometrics analysis. In certain exemplary implementations, the keystroke data can include one or more keypress timings, timings between keypresses, bigram timings, number of pauses during keypress entry, and/or length of pauses during keypress entry. In certain exemplary implementations, the sensor data can include sensor readings from one or more of an accelerometer, a gyroscope, and a light sensor.

Certain exemplary implementations of the disclosed technology can include determining based on the binned values (and by the discriminator module, for example) a normal user interaction between the user browser and the service.

According to an exemplary implementation of the disclosed technology, the collector code self-timing data can include one or more keystroke data, mouse data, touchscreen data, and/or sensor data. In certain exemplary implementations, the keystroke data can include one or more keypress timings, timings between keypresses, bigram timings, number of pauses during keypress entry, and/or length of pauses during keypress entry.

In accordance with certain exemplary implementations of the disclosed technology, if the browser is detected to be in private mode or is subject to an aggregator or malware, the types of actions taken in response to the detection can include marking the user session with an appropriate flag. In some instances, an alert to a fraud system or human operator may be generated. In accordance with certain exemplary implementations of the disclosed technology, a detection of privacy mode may not be enough to warrant an alert, however, the detection of malware may initiate the generation and sending of such an alert.

In certain exemplary implementations, the timing of the client response may be measured to determine the mode of communication. In certain exemplary implementations, the distortion produced by the delays in the client response may also impact behavioral data.

In accordance with certain exemplary implementations of the disclosed technology, detection of bimodal distribution may be used as an indication that the user's browser is deliberately delaying the response of the timing data from the user device (via a web browser or SDK, for example) into fixed values, so as to combat device and user fingerprinting. In one exemplary implementation of the disclosed technology, a response to such detection may include adjusting a behavioral biometrics algorithm to not match new behavioral data to an existing user profile and/or to not use the new behavioral data to train the existing user profile, particularly if the new behavioral data is subjected to a different mode of interference than previously stored behavioral data in the user profile.

Implementations of the subject matter and the functional operations described herein may be implemented in various systems, digital electronic circuitry, computer software, firmware, or hardware, including the structures disclosed herein and their structural equivalents, or in combinations of one or more of them. Implementations of the subject matter described herein can be implemented as one or more computer program products, i.e., one or more modules of computer program instructions encoded on a tangible and non-transitory computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flow described in this specification can be performed by one or more programmable processors executing one or more computer programs to perform functions by operating on input data and generating output. The processes and logic flows can also be performed by, and apparatus can also be implemented as, special purpose logic circuitry, e.g., FPGA (field programmable gate array) or ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory, or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media, and memory devices, including by way of example semiconductor memory devices, e.g., EPROM, EEPROM, flash memory devices. The processor and the memory can be supplemented by, or incorporated into, special-purpose logic circuitry.

While this disclosure includes many specifics, these should not be construed as limitations on the scope of any invention or of what may be claimed, but rather as descriptions of features that may be specific to particular embodiments of particular inventions. Certain features that are described in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described herein should not be understood as requiring such separation in all embodiments.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the disclosed technology.

We claim:

1. A computer-implemented method for remotely detecting and categorizing browsing session manipulation, the method comprising:
   receiving, at a behavioral biometrics server, from an enterprise server executing collector code, and responsive to a user browser accessing a service on the enterprise server, code collector self-timing data, wherein the collector code comprises a recursive function that captures the code collector self-timing data associated with a browsing session, wherein the recursive function calls itself within a fixed interval in a range of 1 to 100 milliseconds;
   computing median values of the code collector self-timing data;
   computing variance values of the code collector self-timing data;
   binning the computed median values and the computed variance values;
   determining based on the binned values, a manipulation associated with the browsing session; and
   based on the determining, sending an alert to an operator of the behavioral biometrics server or a security layer of the behavioral biometrics server.

2. The method of claim 1, wherein the manipulation comprises a privacy mode being engaged in the user browser.

3. The method of claim 1, wherein the manipulation comprises a malware interaction with the browsing session.

4. The method of claim 1, wherein the manipulation comprises an aggregator interaction with the browsing session.

5. The method of claim 1, further comprising modifying a behavioral biometrics algorithm based on the determining.

6. The method of claim 1, further comprising one or more of sending an alert to the enterprise server based on the determining and setting a system flag to mitigate a false positive based on the determining.

7. The method of claim 1, wherein results of the recursive function are stored in a binned distribution database at the behavioral biometrics server.

8. A system configured to remotely detect and categorize browsing session manipulation, the system comprising:
a processor; and
a memory having programming instructions stored thereon, which, when executed by the processor, cause the processor to:
receive, at a behavioral biometrics server, from collector code residing on an enterprise server, and responsive to a user browser accessing a service on the enterprise server, code collector self-timing data, wherein the collector code comprises a recursive function that captures the code collector self-timing data associated with a browsing session, wherein the recursive function calls itself within a fixed interval in the range of 1 to 100 milliseconds;
compute, with a timing data median module, median values of the code collector self-timing data;
compute, with a timing data variance module, variance values of the code collector self-timing data;
bin the computed median values and the computed variance values;
determine, by a discriminator module, based on the binned values, a manipulation associated with the browsing session; and
based on the determining, send an alert to an operator of the behavioral biometrics server or a security layer of the behavioral biometrics server.

9. The system of claim 8, wherein the manipulation comprises a privacy mode being engaged in the user browser.

10. The system of claim 8, wherein the manipulation comprises a malware interaction with the browsing session.

11. The system of claim 8, wherein the manipulation comprises an aggregator interaction with the browsing session.

12. The system of claim 8, further comprising one or more of, based on the determining, modify a behavioral biometrics algorithm, and send an alert to the enterprise server.

13. A non-transitory computer-readable medium having stored thereon software instructions that, when executed by a processor, cause the processor to perform a method of:
receiving, at a behavioral biometrics server, from an enterprise server executing collector code, and responsive to a user browser accessing a service on the enterprise server, code collector self-timing data, wherein the collector code comprises a recursive function that captures the code collector self-timing data associated with a browsing session, wherein the recursive function calls itself within a fixed interval in a range of 1 to 100 milliseconds;
computing median values of the code collector self-timing data;
computing variance values of the code collector self-timing data;
binning the computed median values and the computed variance values;
determining based on the binned values, a manipulation associated with the browsing session; and
based on the determining, sending an alert to an operator of the behavioral biometrics server or a security layer of the behavioral biometrics server.

14. The non-transitory computer-readable medium of claim 13, wherein the manipulation comprises one or more of:
a privacy mode being engaged in the user browser;
a malware interaction with the browsing session; or
an aggregator interaction with the browsing session.

15. The non-transitory computer-readable medium of claim 13, further comprising modifying a behavioral biometrics algorithm based on the determining.

16. The non-transitory computer-readable medium of claim 13, further comprising one or more of sending an alert to the enterprise server based on the determining and setting a system flag to mitigate a false positive based on the determining.

17. The non-transitory computer-readable medium of claim 13, wherein results of the recursive function are stored in a binned distribution database at the behavioral biometrics server.

* * * * *